United States Patent [19]

Kiuchi

[11] Patent Number: 4,716,474
[45] Date of Patent: Dec. 29, 1987

[54] CAMERA-COMBINED MAGNETIC RECORDING-REPRODUCING SYSTEM

[75] Inventor: Takao Kiuchi, Tokyo, Japan

[73] Assignee: Fuji Photo Film Co., Ltd., Japan

[21] Appl. No.: 883,145

[22] Filed: Jul. 8, 1986

[30] Foreign Application Priority Data

Jul. 10, 1985 [JP] Japan ................. 60-149941

[51] Int. Cl.[4] ........................................... G11B 33/06
[52] U.S. Cl. .................................. 360/33.1; 358/906; 358/909; 439/131
[58] Field of Search ............... 358/310, 335, 906, 909, 358/229; 360/33.1, 35.1; 439/131

[56] References Cited

U.S. PATENT DOCUMENTS 4,470,077 9/1984 Komine ........................ 358/906
4,507,689 3/1985 Kozuki et al. ................. 358/906
4,547,815 10/1985 Kimura ......................... 358/906

FOREIGN PATENT DOCUMENTS 57-83972 5/1982 Japan ........................ 358/909
57-127978 8/1982 Japan ........................ 358/906

Primary Examiner—Donald McElheny, Jr.
Attorney, Agent, or Firm—Abelman Frayne Rezac & Schwab

[57] ABSTRACT

A camera-combined magnetic recording-reproducing system of which the magnetic recording-reproducing unit and the camera unit are used either in combination or independently, in which mechanical and electrical connection parts are connected or disconnected by shifting a moving member and locked by engaging projections, thereby providing simple manipulation for mechanical positioning and locking and electrical connection of both units, the projections being withdrawn when the camera unit and the magnetic recording-reproducing unit are separately used.

4 Claims, 7 Drawing Figures

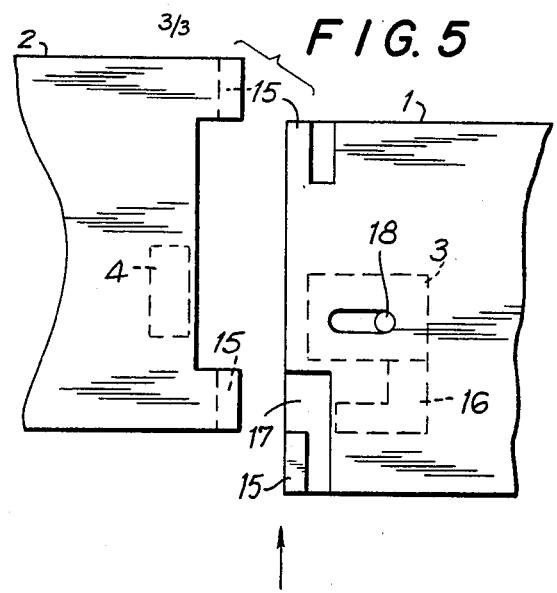
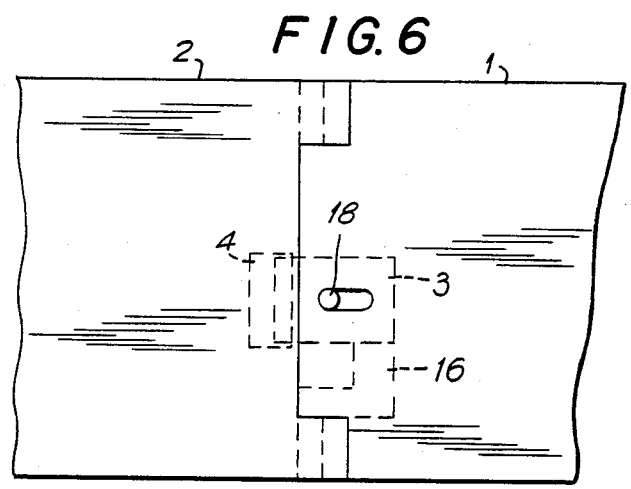
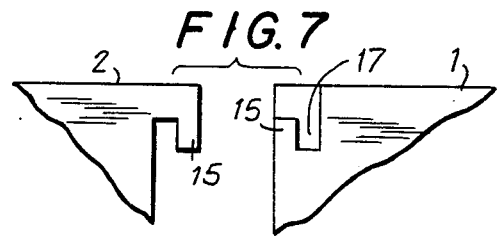

CAMERA-COMBINED MAGNETIC RECORDING-REPRODUCING SYSTEM

BACKGROUND OF THE INVENTION

This invention relates to a camera-combined magnetic recording-reproducing system of which a magnetic recording-reproducing unit and a camera unit are used either in combination or independently, specifically to the structure of connection parts for connecting the magnetic recording-reproducing unit and the camera unit.

Heretofore, a video camera for taking a subject and a magnetic recording system or a magnetic recording-reproducing system have normally been used separately and independently. When the magnetic recording or recording-reproducing system and the camera are used to be in combination, they are electrically connected with a cable and the like.

There has recently become available a system which integrally combines a video camera unit and a magnetic recording-reproducing unit. Since these units are combined in a compact system, it is conveniently used for recording a video for a magnetic recording-reproducing system such as a video tape recorder.

However, the above integral system is defective in that the video camera cannot be connected to a system other than the magnetic recording-reproducing system, such as a recording-only system or a television.

Therefore, there has been proposed a camera-combined magnetic recording-reproducing system of which the camera unit and the magnetic recording-reproducing unit can be used either in combination or separately as needed.

The camera-combined magnetic recording-reproducing system requires connection parts on both the camera unit and the magnetic recording-reproducing unit. The connection parts include a connector for electrical connection and a positioning mechanism and a locking mechanism for mechanical connection. In this case, connecting the connector and locking must normally be made separately. There should be projections or recesses for the connector on the camera unit and the magnetic recording-reproducing unit. The projecting connector is obstructive when the camera unit and the magnetic recording-reproducing unit are separately used, and requires an enclosure or a guard for protecting the connector.

SUMMARY OF THE INVENTION

With a view to obviate all of the prior art defects of camera-combined magnetic recording-reproducing systems, it is a primary object of the present invention to provide a simple operation for connecting the connector, mechanical positioning and locking when the camera unit and the magnetic recording-reproducing unit are combinedly used. Another object of the present invention is to prevent obstruction of projections such as for the connector when the camera unit and the magnetic recording-reproducing unit are separately used.

In accordance with the present invention which attains the above objects, there is provided a camera-combined magnetic recording-reproducing system comprising a camera unit and a recording-reproducing unit, having a connector consisting of a one-side terminal which is disposed on one of connection parts to be engaged of the camera unit and the magnetic recording-reproducing unit and an other-side terminal which is projectably and withdrawably disposed on the other of the connection parts, the other-side terminal being connected with the one-side terminal by operating an external operation means when the connection parts are engaged, and a locking mechanism for locking the connection parts interlockingly with connection of the connector by operating the external operation means.

With such an arrangement according to the present invention, electrical connection of the connector and mechanical locking can be interlocked with improved operation, and obstructive projections on the camera unit and/or the magnetic recording-reproducing unit can be eliminated when the units are separately used.

BRIEF DESCRIPTION OF THE DRAWINGS

FIGS. 1 through 7 are schematics showing preferred embodiments according to the present invention.

FIG. 1 is a schematic view showing the structure of the connection parts of a first embodiment according to the present invention.

FIGS. 2 through 4 are schematic views showing three steps from a combined state to a separate state.

FIGS. 5 through 7 are schematic views showing a second embodiment according to the present invention.

FIG. 5 is a schematic view showing the separate state.

FIG. 6 is a schematic view showing the combined state.

FIG. 7 is a schematic view as viewed in the direction of the arrow in FIG. 5.

DETAILED DESCRIPTION OF THE PREFERRED EMBODIMENTS

Figure 1:
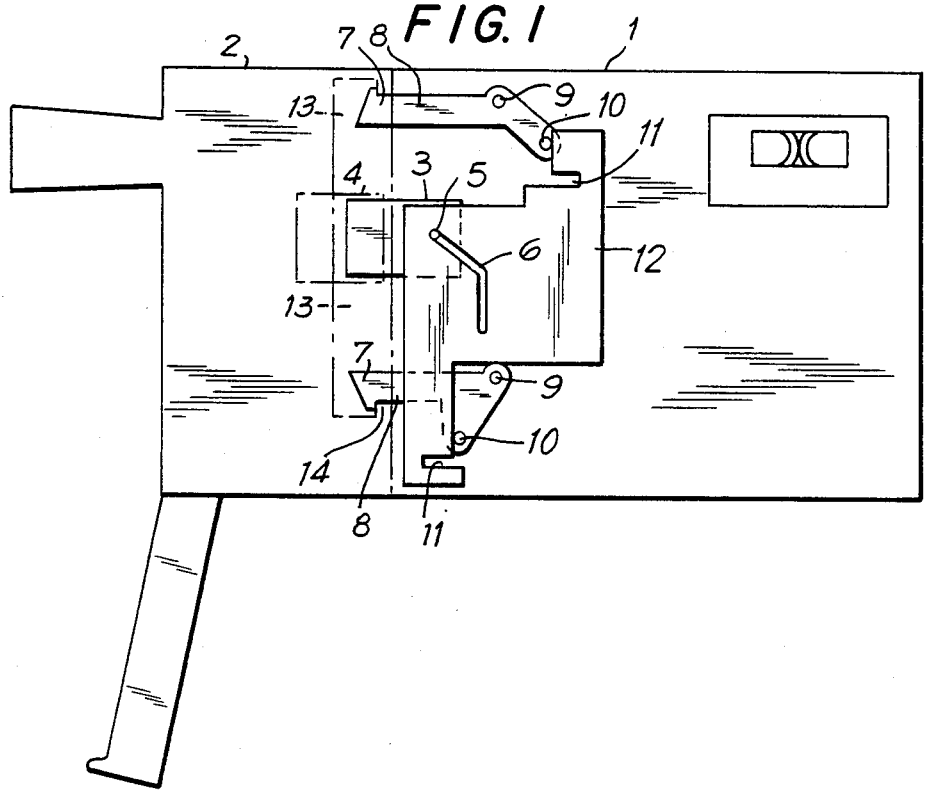

A first embodiment of the camera-combined magnetic recording-reproducing system of the present invention will be described with reference to FIGS. 1 through 4. Referring to FIG. 1, a magnetic recording-reproducing unit 1 such as a video tape recorder and a camera unit 2 have connection parts to engage when the units are combined, and the connection parts include a connector for electrical connection and a locking mechanism for mechanical locking.

The connection part on the magnetic recording-reproducing unit is provided with a moving part 3 of the connector which is projectably and withdrawably disposed at the center of the connection part. The moving part 3 is projected or withdrawn by shifting a pin 5 disposed on the moving part 3 within a curved slot 6 in a moving member 12. Thus, when the moving member 12 is shifted up or down as viewed on the Figure by operating an external operation means which is not shown in the Figure, the pin 5 moves forward or backward within the curved slot 6, thereby projecting or withdrawing the moving part 3 to the right or left as viewed on the Figure.

There are disposed levers 8 at the upper and lower sides respectively of the moving part 3 of the connector which are rotatable around studs 9 so that claws 7 at the front ends of the levers 8 are exposed to outside. By turning pins 10 disposed on the respective levers 8, the levers 8 rotate around the studs 9, thereby projecting or withdrawing the claws 7. The pins 10 come in grooves 11 formed in the moving member 12 for moving the moving part 3 of the connector, and rotate with the movement of the moving member 12. While the levers 8 rotate with the rotation of pins 10, a pin 5 on the moving part 3 is positioned at the vertical part, or not slanted part, of the curved slot 6 of the moving member 12 so that the moving part 3 of the connector does not move.

The connection part of the camera 2 side is provided with a fixed part 4 of the connector corresponding to the moving part 3 of the connector on the magnetic recording-reproducing unit 1, guide recesses 13 to permit the front ends of the levers 8 to rotate when the connection parts are engaged, and engaging parts 14 for engaging and locking the claws 7 of the levers 8.

Figure 2:
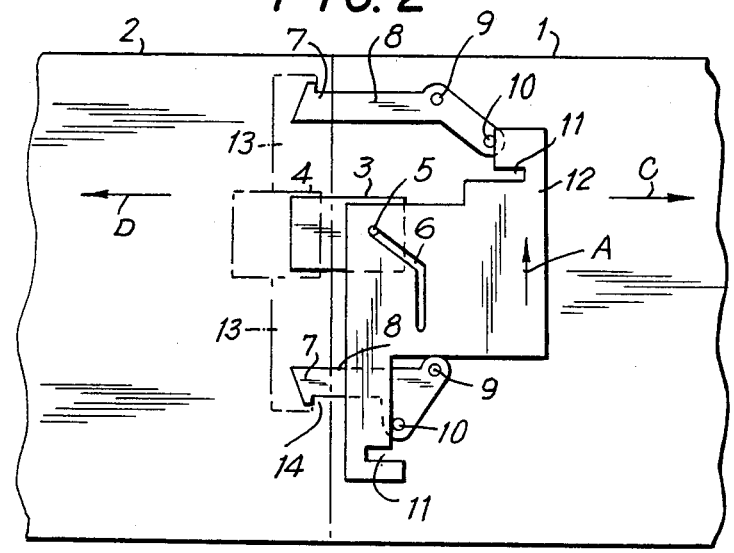
Figure 3:
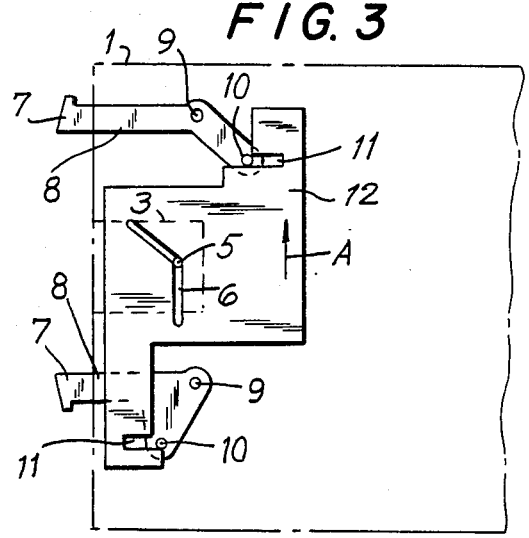
Figure 4:
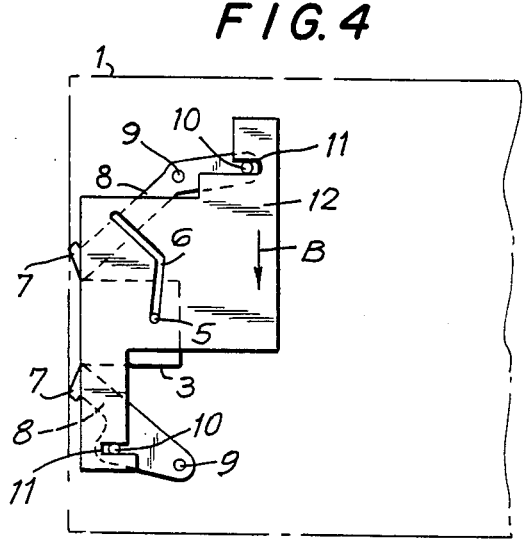

FIGS. 2 through 4 show the steps for separating the camera unit 2 and the magnetic recording-reproducing unit 1 starting from the condition shown in FIG. 1. FIG. 2 shows the same condition as in FIG. 1, in which the moving part 3 and the fixed part 4 of the connector are engaged, the pin 5 is positioned at the end of the slot 6, and the claws 7 of the levers 8 are engaged with the engaging parts 14 so that the pins 10 of the levers 8 come against the moving member 12 and are not rotatable around the studs 9. With this condition, the connector is electrically connected and mechanically locked with the claws. Starting from this condition, when the moving member 12 is shifted up in the direction of arrow A in the Figure by operating the external operation means the pin 5 moves within the slot 6 and the moving part 3 of the connector is withdrawn, the moving part 3 is contained in the connection part, and the pin 5 reaches the bend of the slot 6 as shown in FIG. 3. With this condition, the pins 10 of the levers 8 are at the entrances of the grooves 11.

When the moving member 12 is moved further in the direction of arrow A, the pin 5 of the moving part 3 of the connector moves within the vertical part of the slot 6. Since the horizontal position of the pin 5 does not change, no change in position occurs in the moving part 3 of the connector. On the other hand, the pins 10 of the levers 8 come into the grooves 11 and move with the moving member 12. Thus, the levers 8 turn around the studs 9, come out of the engaging parts 14, and are contained into the connection part. This condition is shown in FIG. 4. With the condition shown in FIG. 4, the moving part 3 of the connector and the levers 8 are completely contained within the magnetic recording-reproducing unit 1, and the camera unit 2 and the magnetic recording-reproducing unit 1 are separated.

When the separated camera unit 2 and the magnetic recording-reproducing unit 1 are to be combined, the connection parts of both units are put together, the external operation means is operated, and the moving member 12 is shifted down in the direction of arrow B in FIG. 4. In this case, the pins 10 move to rotate the levers 8 until the claws 7 engage with the engaging part 14 of the camera unit 2 side. Then the pin 5 moves in the slanted slot 6, and the moving part 3 of the connector is projected to engage with the fixed part 4 of the camera unit 2 side. Thus, the moving part 3 of the connector is electrically connected with the fixed part 4, and the claws 7 are engaged with the engaging part 14 and mechanically locked, thereby combining the camera unit 2 and the magnetic recording-reproducing unit 1 are combined. When both connection parts are put together for combining the camera unit 2 and the magnetic recording-reproducing unit 1, the two levers 8 turn so that they open to outside, and the camera unit 2 and the magnetic recording-reproducing unit 1 are finally positioned relative to each other by the levers 8.

FIGS. 5 through 7 show another embodiment of the camera-combined magnetic recording-reproducing system according to the present invention. Referring to FIG. 7, this embodiment has projections 15 which engage with the connection parts for connecting the camera unit 2 and the magnetic recording-reproducing unit 1, the moving part 3 of the connector and a locking member 16 which is integrally disposed with the moving part 3 at the magnetic recording-reproducing unit 1 side, and the fixed part 4 of the connector at the camera unit 2 side. In this case, the projections 15 are disposed at both the upper and lower sides, as viewed in the Figure, of the connection parts, thereby providing positioning at the both sides and mechanical connection. A notch 17 for the lower projection 15 of the magnetic recording-reproducing unit 1 side is formed long so that both projections 15 may engage with each other and the projections 15 do not move in the vertical direction when the locking member 16 is projected.

The moving part 3 of the connector is moved in the horizontal direction to project or withdraw by horizontal movement of a pin 18 which is connected to the external operation means Since the locking member 16 is disposed integrally under the moving part 3 on which the pin 18 is disposed, the locking member 16 is moved in the horizontal direction to project or withdraw according to movement of the pin 18 within the slot. Therefore, to combine the camera unit 2 and the magnetic recording-reproducing unit 1, the both projections 15 on the both units are first put together to position the units relative to each other. Then the pin 18 is moved to the left by operating the external operation means to engage the moving part 3 with the fixed part 4 of the connector and to project the locking member 16 to lock the projections 15. Thus, electrical connection and mechanical locking of the connector are completed.

Procedure for separating the camera unit 2 and the magnetic recording-reproducing unit 1 is the reverse of the above procedure for combining the units. Thus, the pin 18 is moved to unlock the projections 15 so that the moving part 3 and the locking member 16 are contained within the magnetic recording-reproducing unit 1.

While the moving part 3 of the connector is disposed on the magnetic recording-reproducing unit in the above described embodiments, it may be disposed on the camera unit.

What is claimed is:

1. A camera-combined magnetic recording-reproducing system comprising a camera unit and a magnetic recording-reproducing unit, having a connector consisting of a one-side terminal disposed on one of connection parts to be engaged of said camera unit and said magnetic recording-reproducing unit to be combined and an other-side terminal projectably and withdrawably disposed on the other of said connection parts, said other-side terminal being connected with said one-side terminal by operating an external operation means when said connection parts are engaged, and a locking mechanism for locking said connection parts interlockingly with connection of said connector by operating said external operation means.

2. A camera-combined magnetic recording-reproducing system as claimed in claim 1, having a moving member disposed on one of said camera unit and said magnetic recording-reproducing unit, a connector moving in horizontal direction by vertical movement of said moving member, and levers having claws rotating to engage with or disengage from opposing structures.

3. A camera-combined magnetic recording-reproducing system as claimed in claim 2, having a slanted slot engaging with part of said connector, formed in said moving member for moving said connector in horizontal direction by vertical movement of said moving member, a groove formed in said moving member for rotating said levers around studs in a direction to disengage said claws from said opposing structures by vertical movement of said moving member in one direction, fixing ends formed in said moving member for fixing ends to said levers moving within said slot so as said claws to engage with said opposing structures by movement of said moving member in the other direction.

4. A camera-combined magnetic recording-reproducing system as claimed in claim 1, having projections of the same shape engaging with each other disposed upper and lower sides of said connection parts of said camera unit and said magnetic recording-reproducing unit, a notch as a guide formed in one of said upper and lower projections of one of said connection parts so as said projection not to interfere with a corresponding projection on the other connection part when said camera unit 2 and said magnetic recording-reproducing unit are combined, and a projectable and withdrawable locking member disposed on said notch.

* * * * *